US009039513B2

(12) United States Patent
Schultz et al.

(10) Patent No.: US 9,039,513 B2

(45) **Date of Patent: *May 26, 2015**

(54) SYSTEM AND METHOD FOR DISPLAYING AN EXPLODING ICON

(71) Applicant: Bally Gaming International, Inc., Las Vegas, NV (US)

(72) Inventors: David B. Schultz, Henderson, NV (US); Terence G. Daly, Las Vegas, NV (US); Kimberly J. Cohn, Las Vegas, NV (US); William E. Rommerdahl, Huntington Beach, CA (US); John LaSalvia, Las Vegas, NV (US); John E. Garofalo, Jr., Las Vegas, NV (US); Nathanial A. Hammond, Las Vegas, NV (US); Jack A. Martin, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,342

(22) Filed: Sep. 20, 2013

(65) Prior Publication Data

US 2014/0094255 A1 Apr. 3, 2014

Related U.S. Application Data

(63) Continuation of application No. 11/265,793, filed on Oct. 4, 2005, now Pat. No. 8,574,058.

(60) Provisional application No. 60/615,867, filed on Oct. 4, 2004.

(51) Int. Cl.

*A63F 13/00* (2014.01)
*G07F 17/32* (2006.01)

(52) U.S. Cl.

CPC ............ *G07F 17/3258* (2013.01); *G07F 17/32* (2013.01); *G07F 17/3227* (2013.01)

(58) Field of Classification Search

USPC .............................. 463/16–21, 25, 31, 32, 33

See application file for complete search history.

(56) References Cited

U.S. PATENT DOCUMENTS

| | | | | |
|---|---|---|---|---|
| 5,976,916 | A | 11/1999 | Kuwamura et al. | |
| 6,089,977 | A | 7/2000 | Bennett | |
| 6,251,013 | B1 | 6/2001 | Bennett | |
| 6,270,411 | B1 * | 8/2001 | Gura et al. | 463/20 |
| 6,275,570 | B1 * | 8/2001 | Homan et al. | 379/88.17 |
| 6,311,976 | B1 | 11/2001 | Yoseloff et al. | |

(Continued)

*Primary Examiner* — Sunit Pandya

(74) *Attorney, Agent, or Firm* — Brooke W. Quist; Marvin A. Hein; Philip J. Anderson

(57) ABSTRACT

Systems, gaming machines, and methods for displaying an exploding icon are disclosed. One method includes receiving player input to activate a primary game; activating the primary game; presenting the activated game on a single screen of a video display, the activated game comprising a primary game displaying one or more game icons in various locations on a main screen of the video display and upon the occurrence of a triggering event, the primary game appears to animate at least one of the displayed game icons and move one or more wild icons about the main screen of the video display over one or more of the game icons, and randomly replacing one or more of the game icons with the one or more wild icons; determining whether the resulting combination of game icons and wild icons form any winning combinations; and awarding a single game payout for the primary game.

21 Claims, 11 Drawing Sheets

(56) References Cited

U.S. PATENT DOCUMENTS

| | | | | |
|---|---|---|---|---|
| 6,375,570 | B1 | 4/2002 | Poole | |
| 6,419,579 | B1 | 7/2002 | Bennett | |
| 6,439,993 | B1 | 8/2002 | O'Halloran | |
| 6,517,432 | B1 * | 2/2003 | Jaffe | 463/16 |
| 6,517,433 | B2 | 2/2003 | Loose et al. | |
| 6,551,187 | B1 | 4/2003 | Jaffe | |
| 6,612,927 | B1 | 9/2003 | Slomiany et al. | |
| 6,648,758 | B2 | 11/2003 | Bennett | |
| 6,780,109 | B2 | 8/2004 | Kaminkow | |
| 6,905,406 | B2 | 6/2005 | Kaminkow et al. | |
| 6,918,832 | B2 * | 7/2005 | Baerlocher et al. | 463/20 |
| 6,939,228 | B2 | 9/2005 | Shimizu | |
| 6,960,134 | B2 | 11/2005 | Hartl et al. | |
| 7,014,559 | B1 | 3/2006 | Fong | |
| 7,070,502 | B1 | 7/2006 | Bussick et al. | |
| 7,192,345 | B2 | 3/2007 | Muir et al. | |
| 7,195,559 | B2 * | 3/2007 | Gilmore et al. | 463/20 |
| 2003/0013517 | A1 | 1/2003 | Bennett | |
| 2003/0013519 | A1 | 1/2003 | Bennett | |
| 2003/0064779 | A1 * | 4/2003 | Suda | 463/20 |
| 2005/0054423 | A1 * | 3/2005 | Wadleigh | 463/20 |
| 2005/0059476 | A1 | 3/2005 | Vancura | |

* cited by examiner

SYSTEM AND METHOD FOR DISPLAYING AN EXPLODING ICON

CROSS-REFERENCE TO RELATED APPLICATIONS

This application is a continuation of U.S. patent application Ser. No. 11/265,793, filed Oct. 4, 2005, which claims the benefit of U.S. provisional patent application No. 60/615,867, filed on Oct. 4, 2004, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Many types of gaming machines have been developed with various features to captivate and maintain player interest. For example, gaming machines may include flashing displays, lighted displays, or sound effects to capture a player's interest in a gaming device. Furthermore, over the years, the mechanical reels of slot machines have been replaced with video depictions of spinning reels.

Nevertheless, an important feature of maintaining player interest in a gaming machine is providing the player with many opportunities to win cash awards. For example, in some slot machines the display windows show more than one adjacent symbol on each reel, thereby allowing for multiple row betting. Other types of slot machines have been developed that offer "second chance" or bonus games that provide players with additional opportunities to win. Furthermore, some gaming machines offer a player the opportunity to win millions of dollars by providing progressive jackpots. While these gaming machine variants have been successful, there remains a need for gaming machines that provide a player with enhanced excitement and an increased opportunity of winning.

SUMMARY

Briefly, and in general terms, various embodiments disclosed herein are directed to presenting an animated icon. In one embodiment, a method is disclosed for playing a primary game on a gaming machine. The method includes: receiving player input to activate a primary game; activating the primary game; presenting the activated game on a single screen of a video display, the activated game comprising a primary game displaying one or more game icons in various locations on a main screen of the video display and upon the occurrence of a triggering event, the primary game appears to animate at least one of the displayed game icons and move one or more wild icons about the main screen of the video display over one or more of the game icons, and randomly replacing one or more of the game icons with the one or more wild icons; determining whether the resulting combination of game icons and wild icons form any winning combinations; and awarding a single game payout for the primary game.

In another embodiment, a method is disclosed for playing a game on a gaming machine. The method includes: receiving player input to activate a primary game on the gaming machine; activating the primary game and displaying one or more game icons in various fixed locations on a main screen of a video display; presenting an animated event upon the occurrence of a triggering event during the primary game, wherein the animated event comprises moving a game icon over the various fixed locations on the display screen, appearing to animate at least one of the displayed game icons, producing one or more wild icons from the moving game icon, and randomly replacing one or more game icons in the various fixed locations on the main screen of the video display with the one or more wild icons; determining whether the resulting combination of game icons and wild icons form any winning combinations; and awarding a single payout for the primary game based on one or more winning combinations.

In still another embodiment, a primary wagering game is disclosed that is configured to be played in conjunction with a video gaming device. The primary wagering game includes one or more game icons for display in various locations on a main screen of a video display. At least a first game icon is animated to present an animated interaction between the first game icon and a second game icon that produces one or more additional icons from the second game icon. Continuing, at least one animated icon is configured to produce one or more wild icons that move about the same main screen of the video display and then are randomly positioned in fixed locations on the main screen of the video display. Notably, player input affects the number of wild icons produced. Additionally, the primary wagering game includes a means for triggering the presentation of the animated icon, a means for evaluating whether one or more combinations of the game icons and the wild icons form any winning combinations, and a means for awarding a payout for each winning combination.

Other features and advantages of the various embodiments will become apparent from the following detailed description, taken in conjunction with the accompanying drawings, which illustrate by way of example, the features of the various embodiments. Embodiments of the animated bonus graphic are illustrated and described herein, by way of example only, and not by way of limitation.

DETAILED DESCRIPTION

Briefly, and in general terms, there is provided a system and method for displaying an animated icon. More particularly, there is provided a method and system for presenting an animated icon that produces one or more wild icons in a wagering game.

Figure 1:
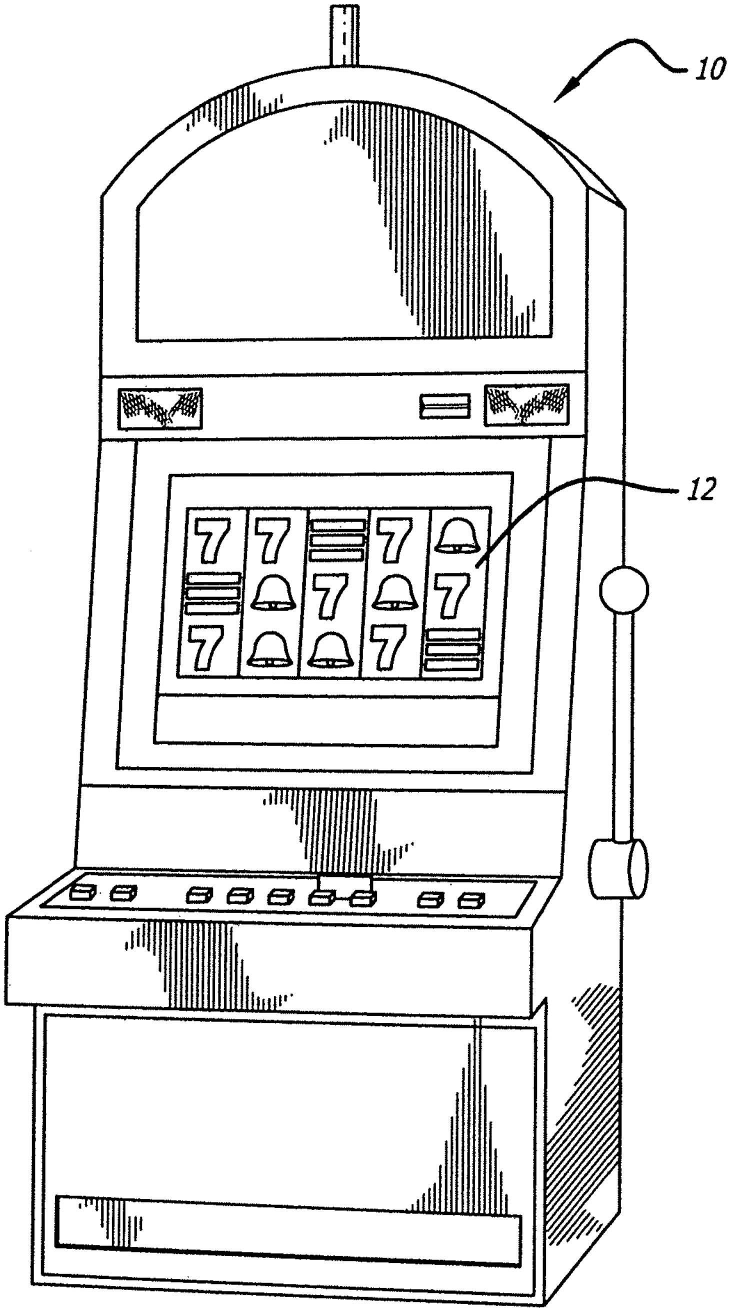
FIG. 1 is an illustration of a gaming machine comprising an embodiment of the animated icon.

Referring now to FIG. 1, a gaming machine 10 having a display screen 12 is shown. In various embodiments, the display screen 12 is a video display such as, but not limited to, a CRT (cathode ray tube), or a thin-panel display. Examples of thin-panel displays include plasma, LCD (liquid crystal display), electroluminescent, vacuum fluorescent, field emission, or any other types of thin panel displays known or developed in the art. In various embodiments, the gaming machine 10 may be a video slot machine, video poker machine, video blackjack machine, or a gaming machine offering one or more of the above-described games.

Generally, the gaming machine 10 also comprises a gaming mechanism (not shown), which provides a game for play on the gaming machine 10. Alternatively, the gaming mechanism provides a plurality of games for play on the gaming machine 10. Optionally, in one embodiment, the gaming mechanism includes at least one storage device for storing gaming software and a processor for executing the software. The gaming machine 10 is capable of displaying one or more games on the display screen 12. A game player activates a game on the gaming machine 10 and engages in play of the game. The player may interact with the gaming machine via player input components which may include, but are not limited to, a keypad or equivalent, one or more game buttons located on the gaming machine, an arm or lever, a touch screen and the like. As the player plays the game, the resulting game outcome is shown on the display 12.

In various embodiments of the gaming machine 10, animation graphics, sound files and other media data for use with the gaming machine 10 are stored in a memory device (not shown). By way of example, but not by limitation, such memory devices include external memory devices, hard drives, CD-ROMs, DVDs, and flash memory cards. In an alternative embodiment, the animation graphics are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together.

The gaming machine 10 comprises a game having an animated event feature. In one embodiment, the game is designed such that predetermined triggers activate the animated event during the play of a primary game. Optionally, the animated event may be activated during the play of a secondary or bonus game. Many actions or situations may be designated as a trigger for activating the animated event. For example, the presence of a particular icon on the display may be designated as a trigger for activating an animated event. Furthermore, the presence of one or more particular icons in a particular location on the display may also be designated as a trigger for activating an animated event. Optionally, the trigger for activating the animated bonus event may include, but is not limited to, the occurrence of a particular winning combination of symbols, a particular number of consecutive wins, a maximum number of bets, a particular time (of day, month, or year), the detection of a particular player, and the like. Additionally, more than one of the above-described actions may be designated as a trigger.

Figure 2:
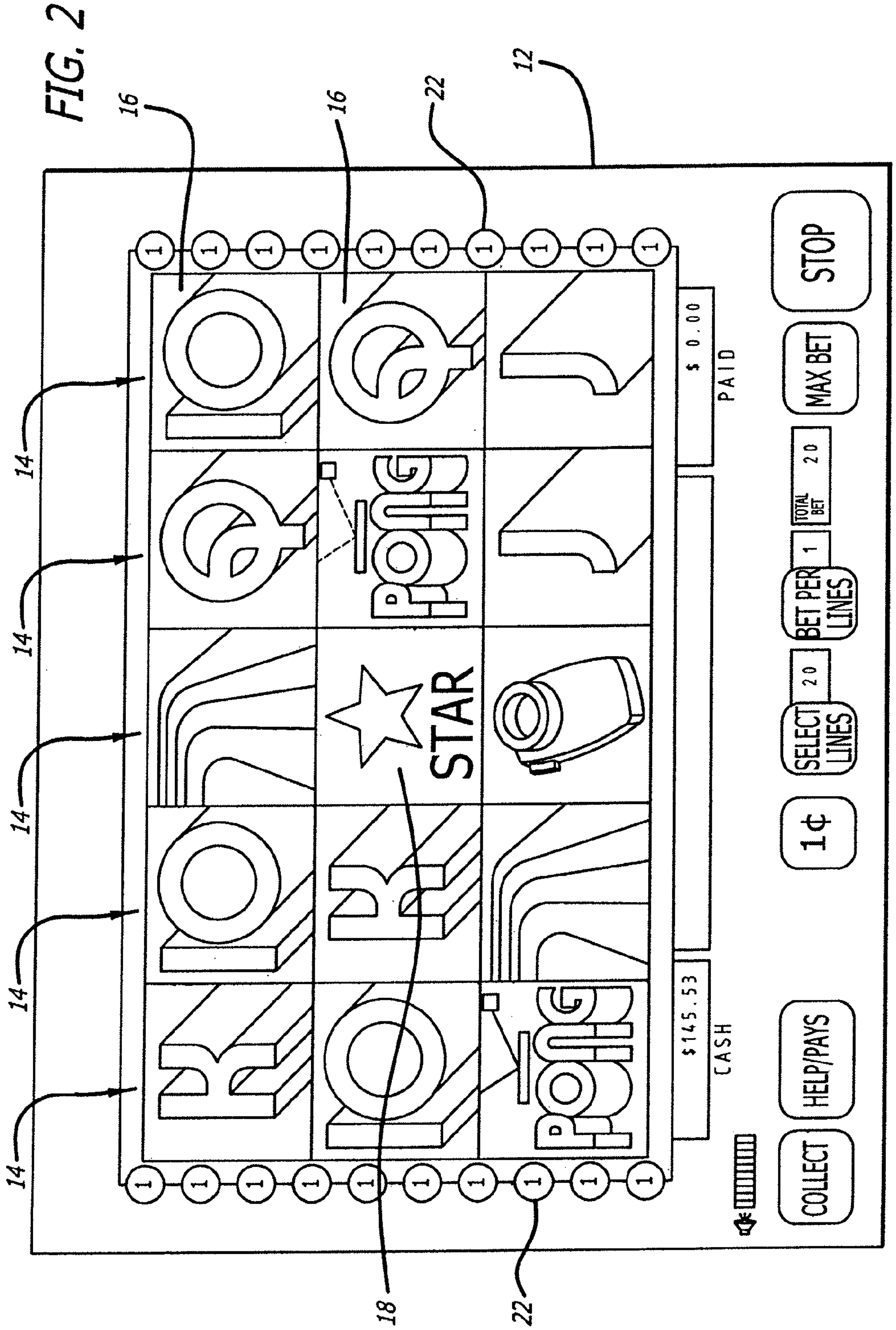
FIG. 2 is a screen shot of a game comprising an embodiment of the animated icon.

Referring to FIG. 2, a display screen 12 of the gaming machine 10 is shown. The display screen 12 presents the discernable indicia of a reel 14 (i.e., a video representation of a reel). As such, FIG. 2 illustrates the discernable indicia of five "reels" 14. The discernable indicia of the reels 14 include one or more game icons 16. As those skilled in the art will appreciate, the game shown on display screen 12 may be configured to show any number of the discernable indicia of a reel 14. In alternate embodiments, the discernable indicia (not shown) may be of a playing card, bingo card, keno card or the like.

Furthermore, the game icons 16 may include any symbol, number, picture, and pictograph known or developed in the art. The game icon 16 may be a specialized symbol such as a wild symbol, a multiplier symbol (e.g., 2×, 3×, or the like), a symbol that triggers an animated event (not shown), or the like.

As shown in FIG. 2, the game includes at least ten paylines 22. However, those skilled in the art will appreciate that the game may have any number of paylines 22. Based upon a standard pay table, various combinations of game icons 16 present on the payline 22 may have different payout values. Alternatively, a non-standard pay table may be used to determine the payout values for various combinations of game icons 16 on a payline 22 in response to a bonus event, promotional event, or the like.

Figure 3:
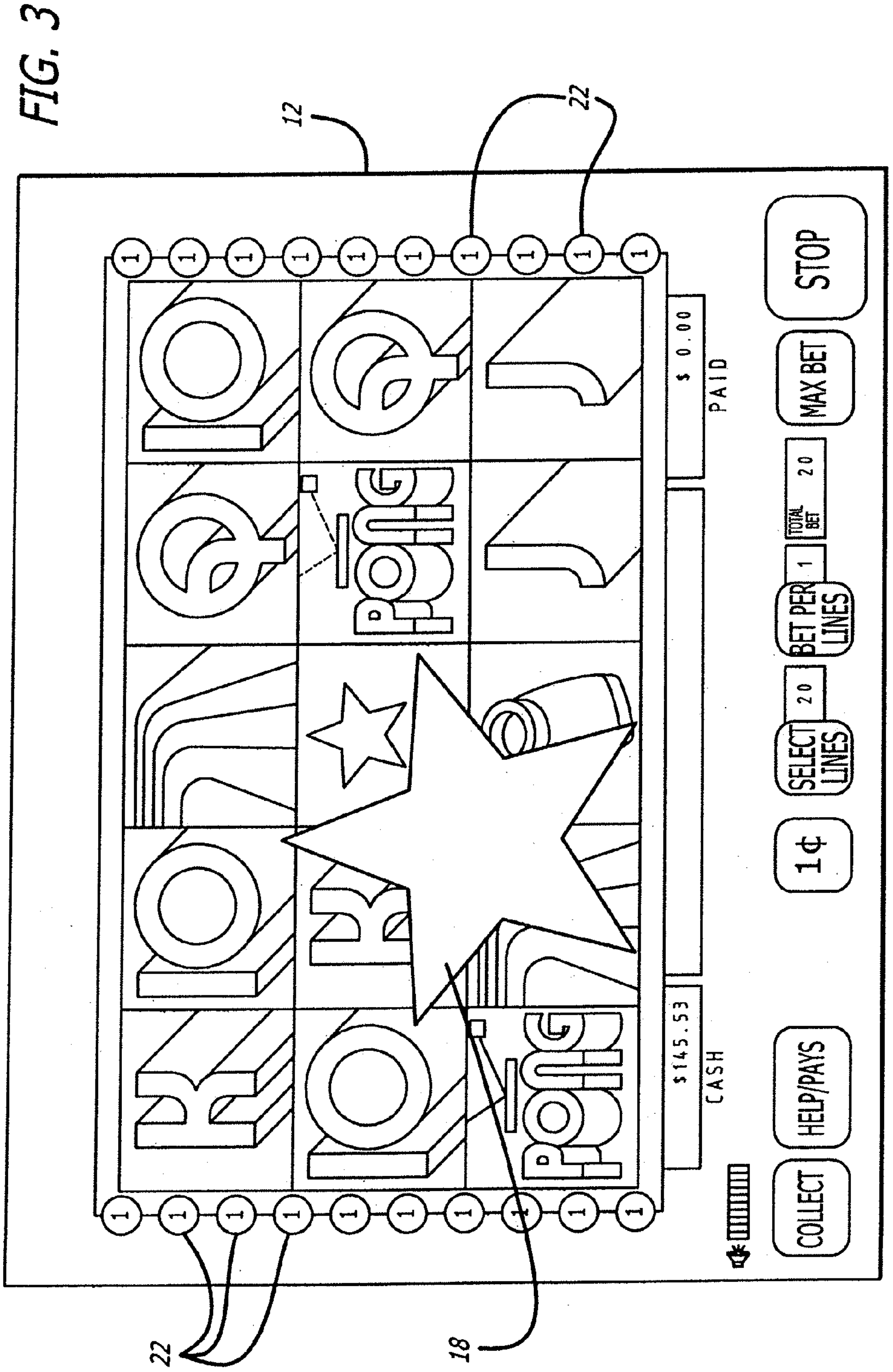
FIG. 3 is a screen shot of a game comprising an embodiment of the animated icon.
Figure 4:
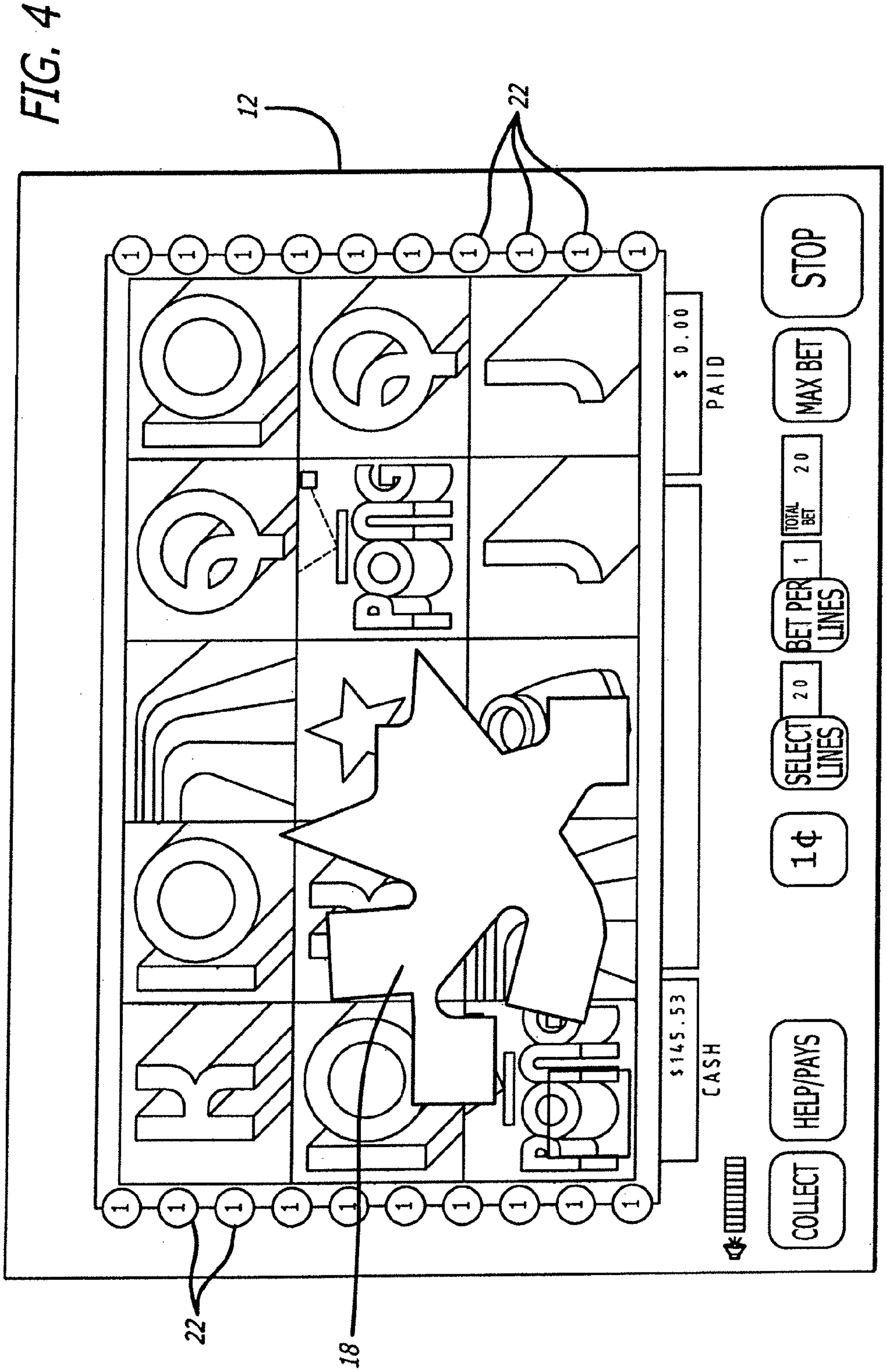
FIG. 4 is a screen shot of a game comprising an embodiment of the animated icon.
Figure 5:
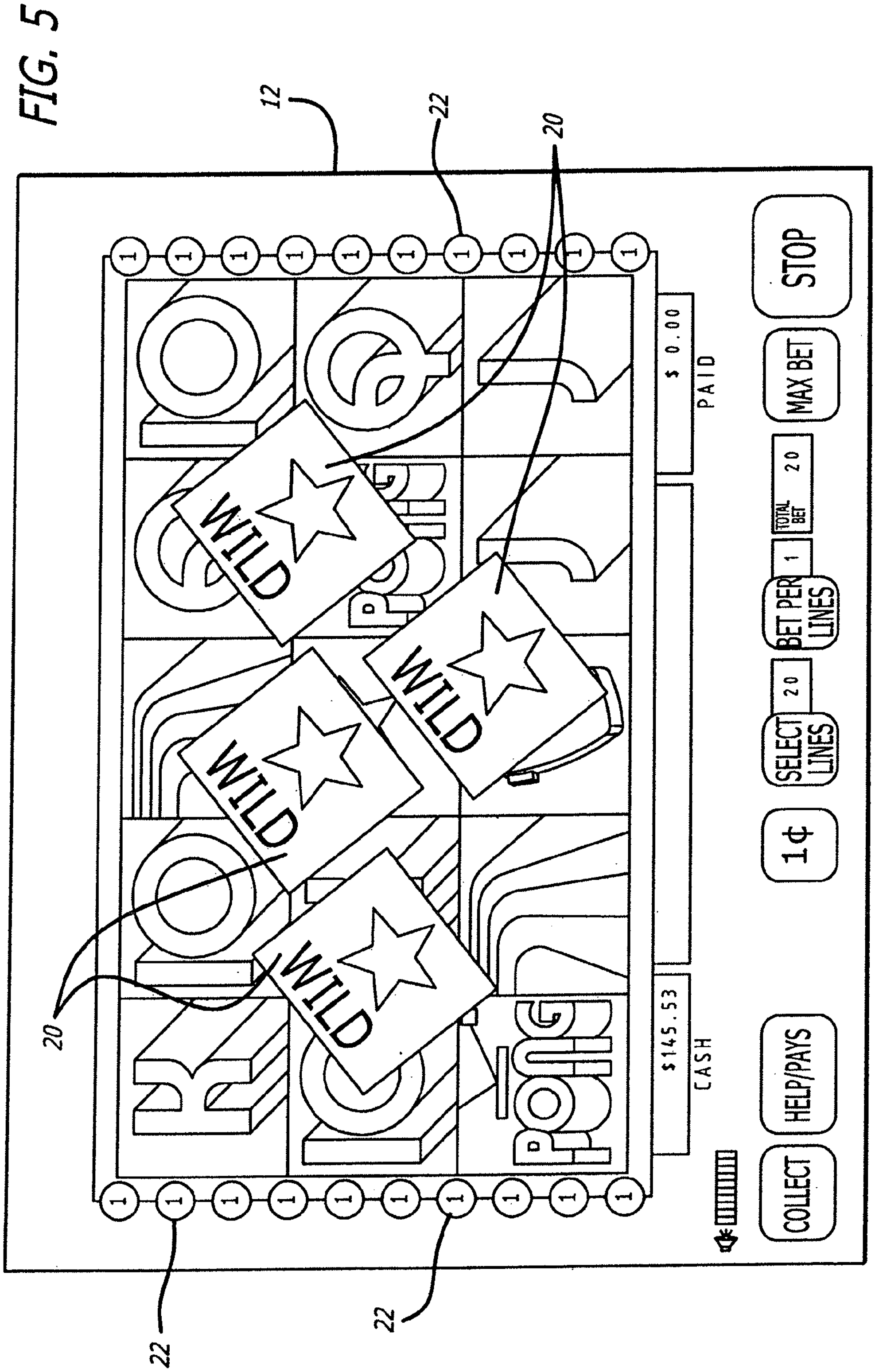
FIG. 5 is a screen shot of a game comprising an embodiment of the animated icon.
Figure 6:
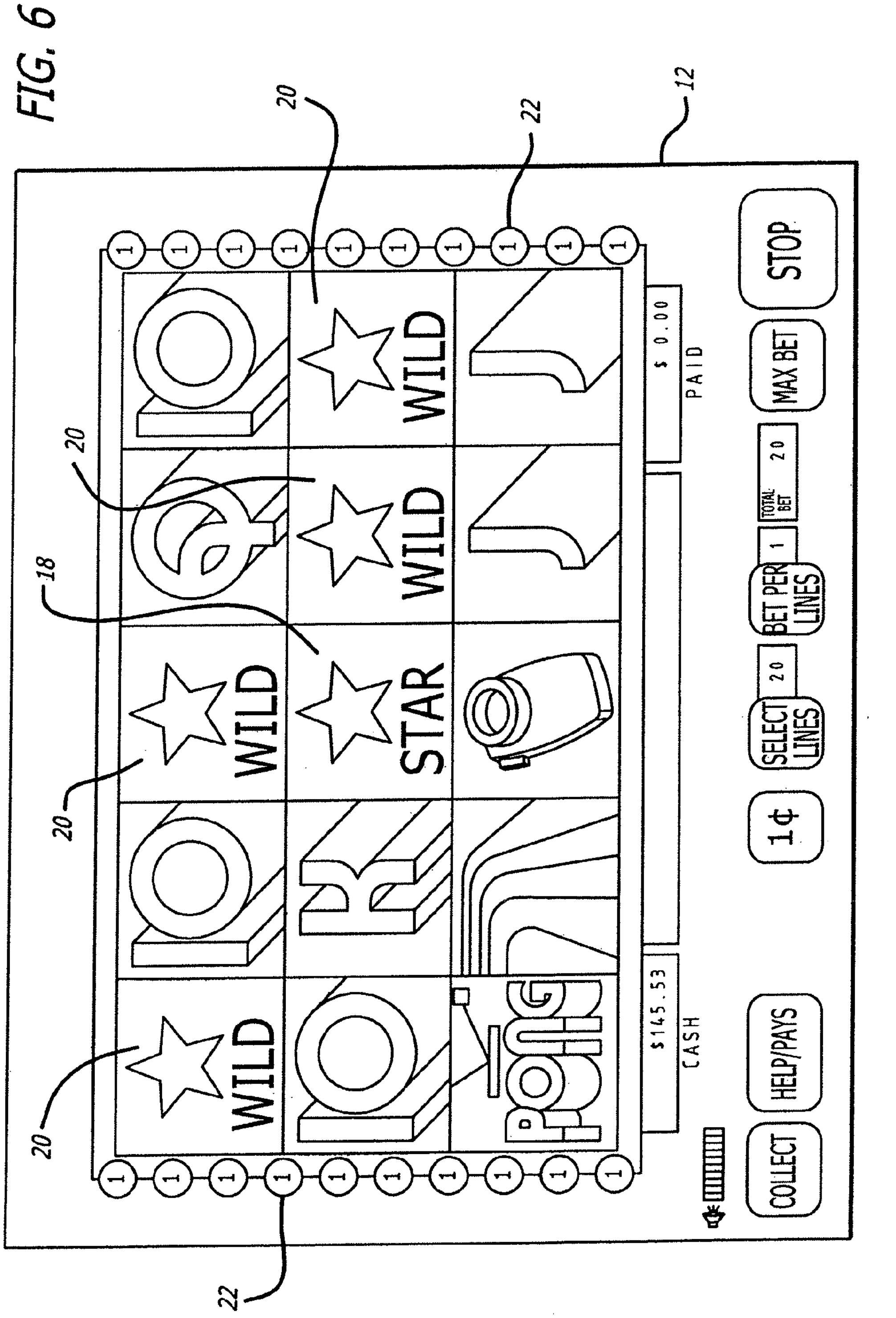
FIG. 6 is a screen shot of a game comprising an embodiment of the animated icon.

In FIG. 2, the presence of a particular game icon (for this example the STAR icon 18) in the center position of the game display screen 12 triggers an animated event. As those skilled in the art will appreciate, the presence of the STAR icon 18 in any location on the display screen 12 may be defined to trigger the presentation of an animated event. Referring now to FIG. 3, the animated event comprises the animation of the STAR icon 18. Once the animated event has been activated, the STAR icon 18 appears to enlarge on the screen and appears to move forward towards the user. The enlarged STAR icon 18 then explodes on the screen as illustrated in FIG. 4. The explosion appears to take place on top of, or over, the other game icons 16 on the display screen 12. The exploding STAR icon 18 then explodes into one or more wild icons 20. Referring to FIG. 5, the exploding STAR icon 18 explodes and morphs into four wild icons 20 that are displayed moving across the display screen 12 over the other stationary game icons 16. The four wild icons 20 move around the screen before being positioned at random stationary locations. FIG. 6 illustrates an example of the fixed positions of the four wild icons 20. Once the four wild icons 20 are in position in fixed locations, the resulting combinations of game icons and wild icons presented on the display screen 12 are evaluated to determine whether or not any winning paylines are present. If a winning combination is present on a payline, an award is dispensed to the player. The award may be actual cash (or coin), voucher, game credits, free game play, or a combination thereof. Alternatively, the award may be merchandise such as, but not limited to, a house, car, motorcycle, boat, jewelry, or the like. In another embodiment, the award may be services such as, but not limited to, vacations, spa packages, free hotel rooms, free meals, free drinks, or a combination thereof.

Figure 7:
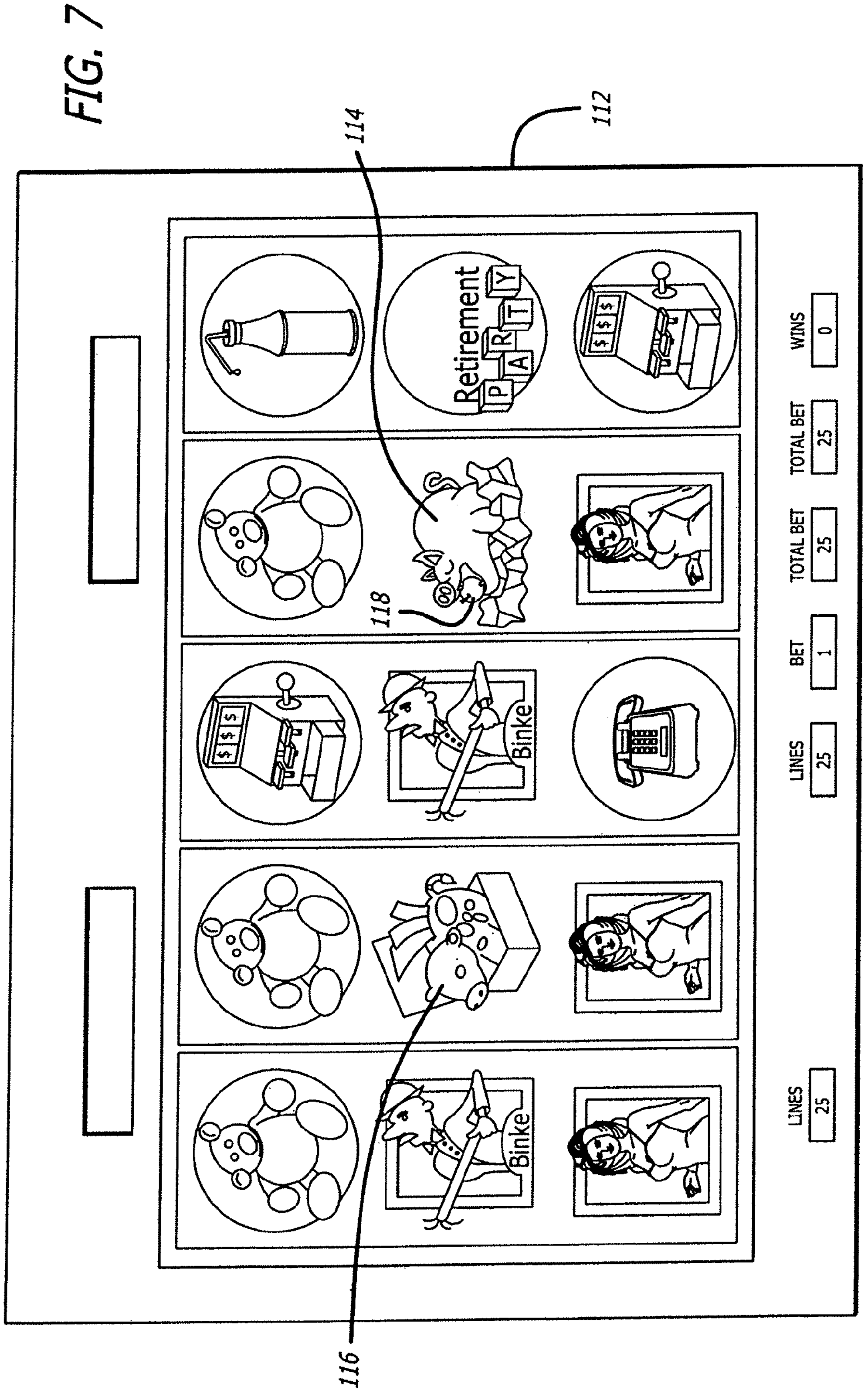
FIG. 7 is a screen shot of a game comprising an embodiment of the animated icon.
Figure 8:
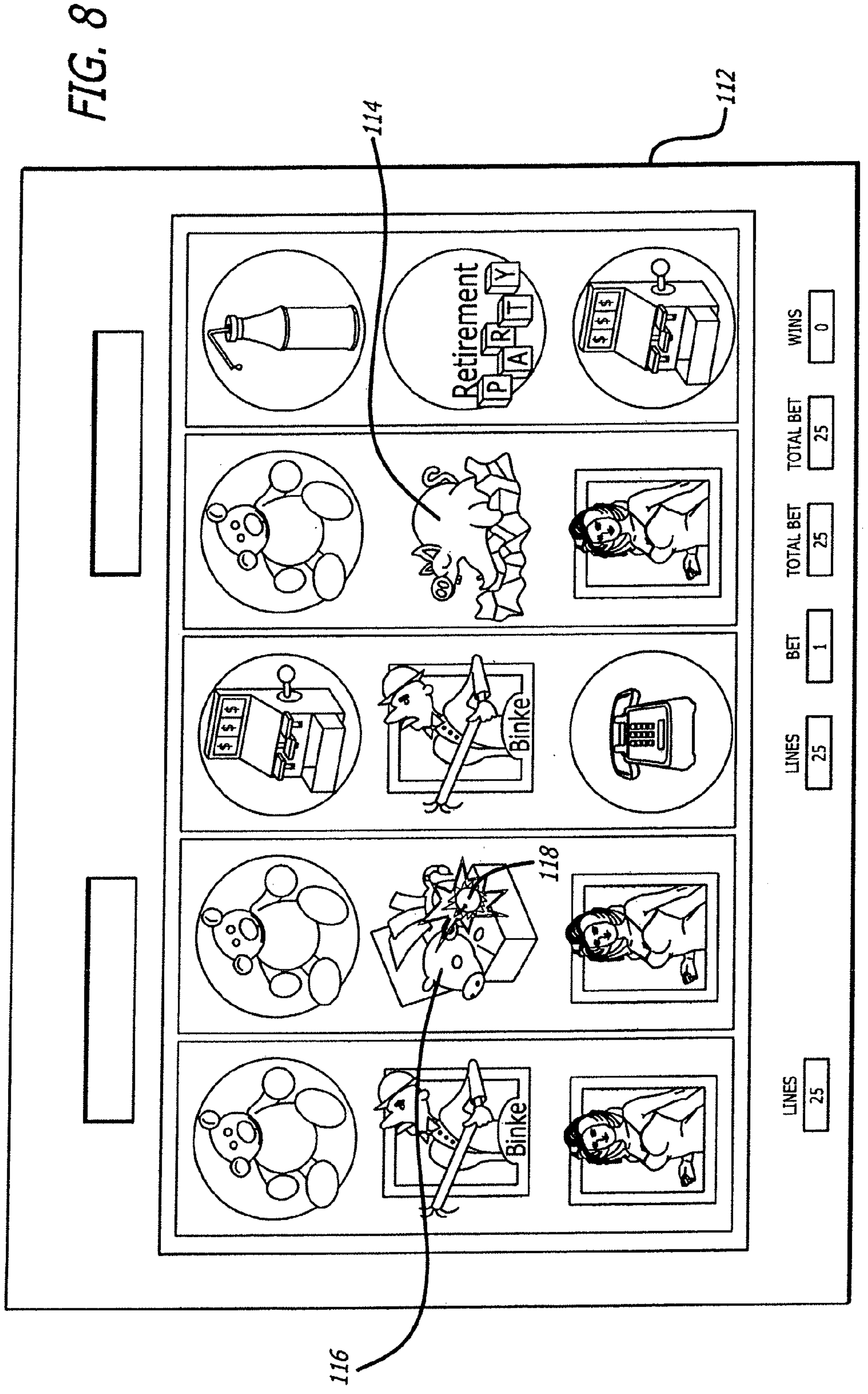
FIG. 8 is a screen shot of a game comprising an embodiment of the animated icon.
Figure 9:
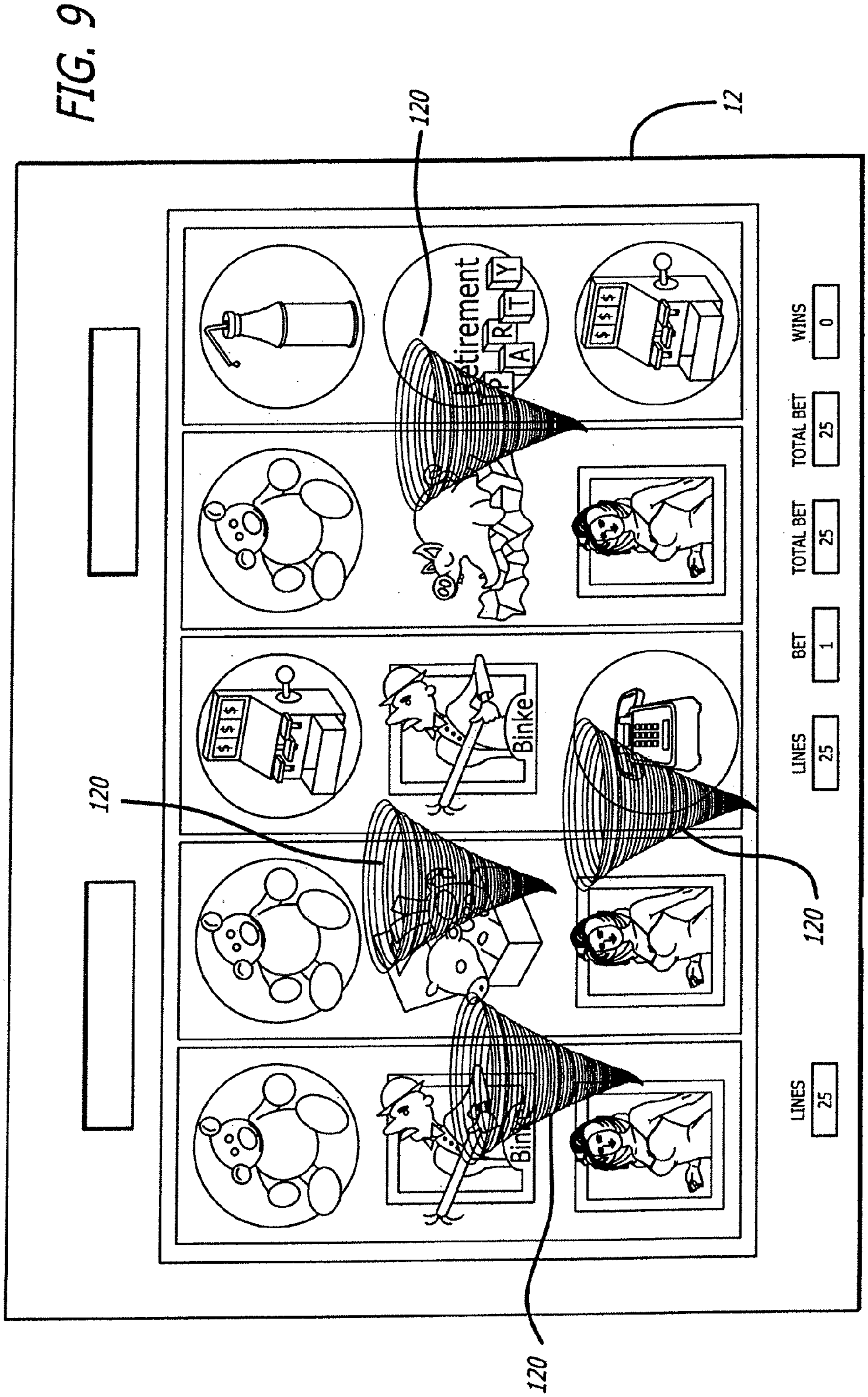
FIG. 9 is a screen shot of a game comprising an embodiment of the animated icon.
Figure 10:
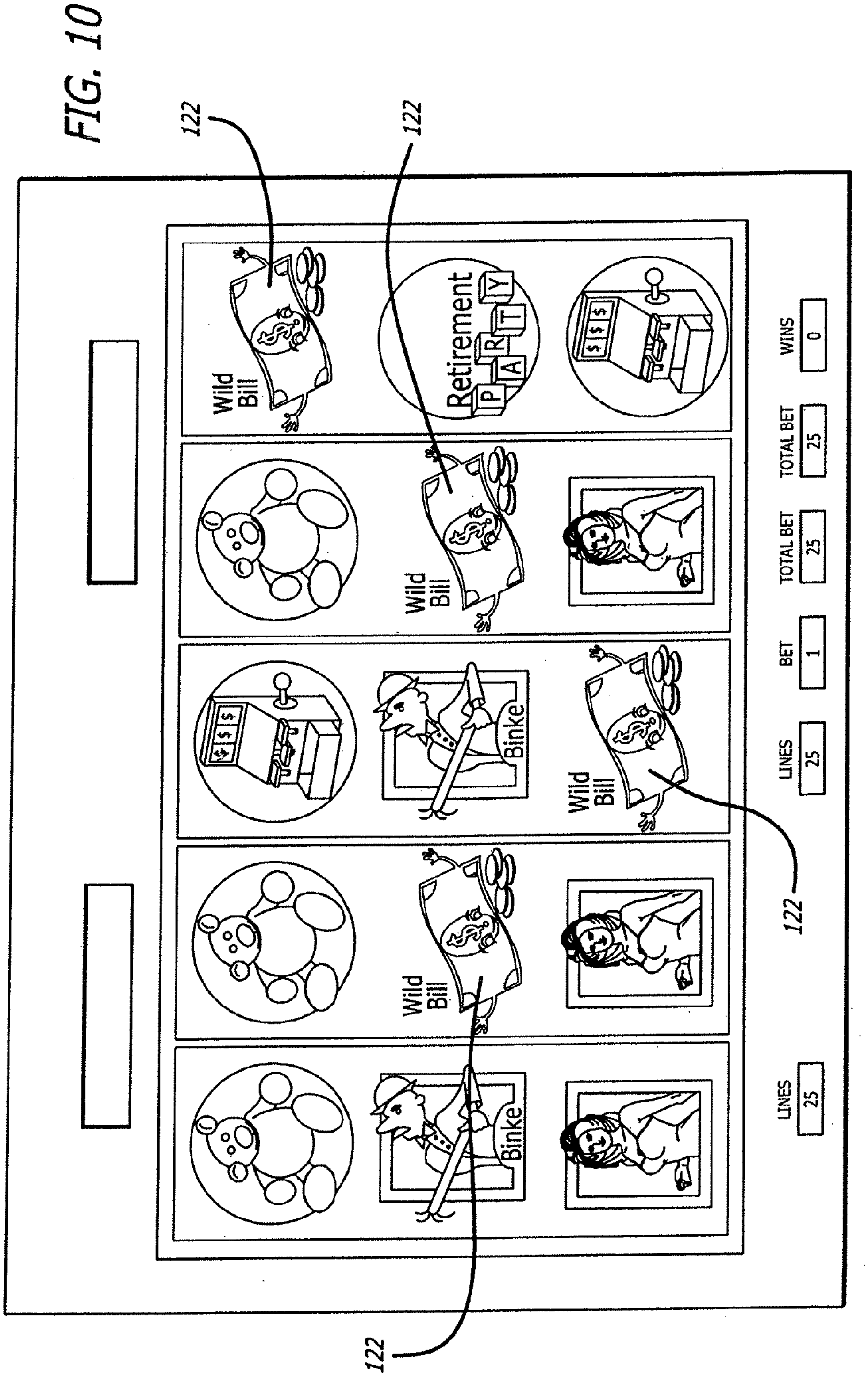
FIG. 10 is a screen shot of a game comprising an embodiment of the animated icon.

Alternatively, in another embodiment, the presence of two or more game icons in specific positions on the display screen may be the trigger for activating an animated event. For example, referring to FIG. 7, the presence of the pig icon 114 and the cow bank icon 116 in their respective shown locations on a display 112 triggers the activation of an animated event. Once the animated event has been activated, the pig icon 114 throws the apple 118 from its mouth at the cow bank icon 116. The cow bank icon 116 appears to burst or explode once it is hit by the apple 118, as shown in FIG. 8. As the cow bank icon 116 explodes, it disgorges multiple wild icons 120. As those skilled in the art will appreciate, any number of wild icons may be disgorged. Referring to FIG. 9, four wild bill icons 120 disgorged from the cow bank icon 116 begin to spin. These wild bill icons 120 move randomly about the display screen until finally each settles in a fixed location. In FIG. 10, four stationary wild bill icons 122 have been positioned in fixed locations. The resulting patterns are evaluated to determine if any winning paylines are present. In another embodiment, those skilled in the art will appreciate that the animation event may include any number of animated icons interacting with one another to produce one or more wild icons.

Optionally, in another embodiment, the presence of one or more particular icons, anywhere on the screen, regardless of the position, is a trigger for activating an animated event. For example, in one embodiment the presence of the pig icon 114 and the cow bank icon 116 in "any" location triggers the animated event. Alternatively, in another embodiment, the presence of the pig icon 114 in a location adjacent to the location of the cow bank icon 116 triggers an animated event.

Optionally, while any number of wild icons may be produced during the animation event, it is not necessary to position all of the wild icons in a fixed location on the screen. Rather, any number of the wild icons may settle into a fixed location. For example, if four wild icons are produced, then one to four of the icons may permanently settle in a fixed position. In one embodiment, all of the produced icons settle permanently in a stationary position on the screen. Alternatively, in another embodiment, less than all of the produced wild icons settle to a fixed location. If four wild icons are produced, only three may settle on the screen. Alternatively, if four wild icons are produced, only two may settle on the screen. Optionally, if four wild icons are produced, only one may settle on the screen.

In various embodiments, the number of wild icons produced from the animated event may be dependent on factors such as, but not limited to, the number of bets placed, the number of lines bet, or a combination thereof. Alternatively, the number of wild icons produced from the animated event may be completely random and does not depend on a player action. Additionally, the number of produced wild icons actually positioned in a fixed location may be dependent on the number of bets placed, or the number of lines bet. Alternatively, the number of wild icons positioned in a fixed location may be completely random and may not depend on player action.

In another embodiment, player interaction may affect the number and/or placement of the wild icons. For example, in a gaming device having a touch screen, the player may touch the animated source as it produces the wild icons. The number of times the player touches the animated source will correspond to the number of wild icons produced. Optionally, the game will have a pre-defined maximum limit of allowable wild icons to prevent the player from generating too many wild icons. Additionally, as the produced wild icons are being moved about the screen, the player may have the option of touching the screen to affect the placement of the wild icons.

Optionally, in another embodiment, the one or more of the wild icons positioned in a fixed location on the display screen may be a multiplier wild icon. Alternatively, the fixed wild icons may comprise "regular" wild icons and multiplier wild icons.

In an alternative embodiment, an electronic wagering machine is activated and displays one or more game icons. The game icons are configured to become animated upon the occurrence of a triggering event. Once the animation of one or more icons is triggered, an animated event is displayed, and one or more additional icons are produced. The additional icons are not necessarily wild icons. Rather, the additional icons may be any "normal" game icon displayed during the play of the game. The additional icons are moved about the display screen and are positioned in random fixed locations on the display screen. The resulting combination of game icons and additional game icons are evaluated to determine whether any winning combinations are present. In an optional embodiment, both wild icons and additional non-wild icons are produced from an animated event.

Figure 11:
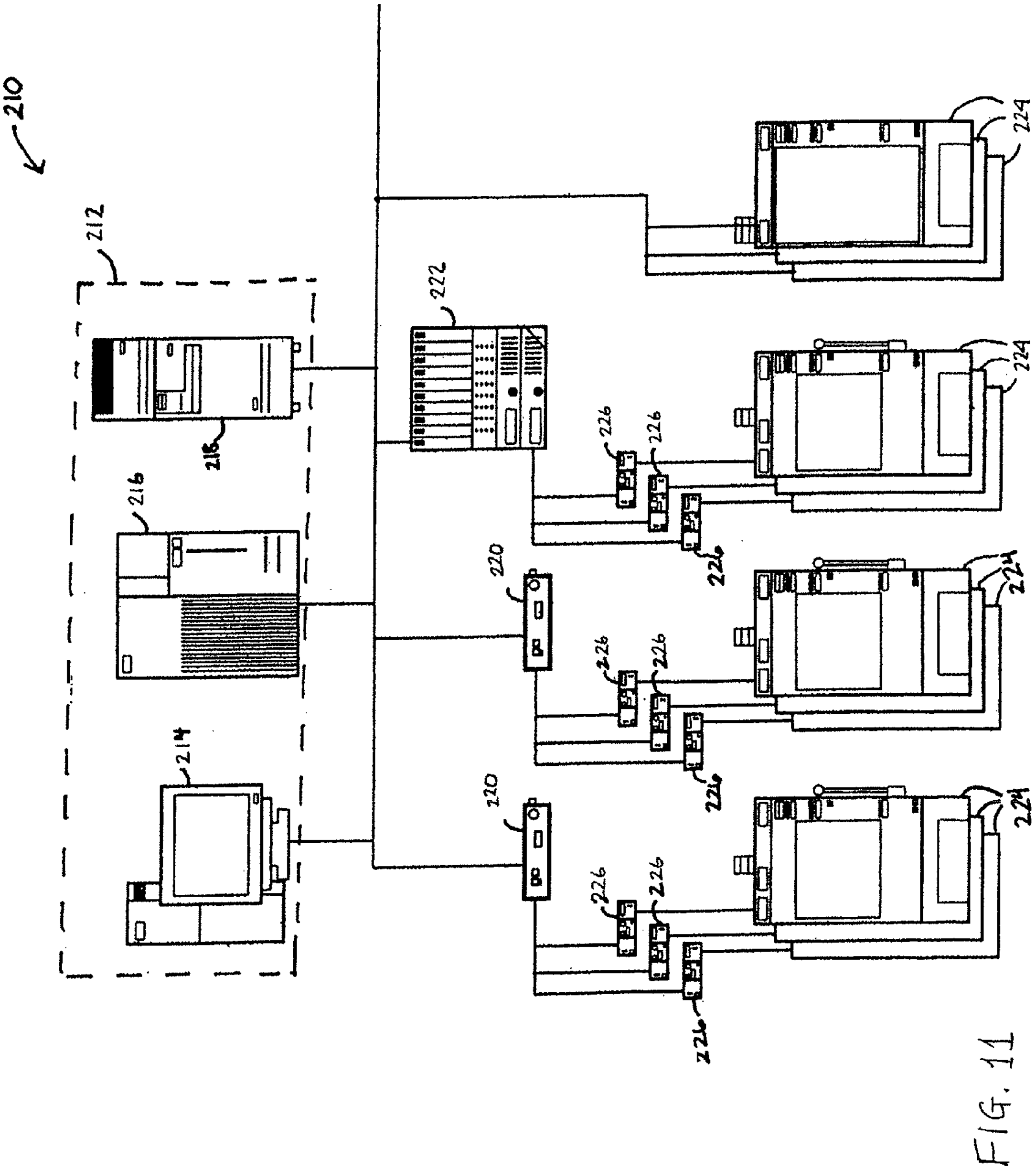
FIG. 11 is a schematic illustration of a gaming system for use in accordance with an embodiment of the animated icon.

In another embodiment, a gaming machine is operatively connected, via a network connection, to a casino gaming system. In another embodiment, a gaming machine is operatively connected, via a network connection, to a casino gaming system. Referring to FIG. 11, a casino gaming system 210 is shown. The casino gaming system 210 comprises back-end server system 212, network bridges 220, a network rack 222, gaming machines 224 and game management units 226 all connected via a system network.

A variety of types of servers may be included in the back-end server system 212. The type of server used is generally determined by the platform and software requirements of the gaming system. Additionally, the back-end server system 212 may be configured to comprise multiple servers. In one embodiment, as illustrated in FIG. 11, the back-end server system 212 is configured to include three servers. Specifically, servers 214, 216 and 218 form the back-end server system 212, or the back-end servers. In one example, server 214 is a Windows-based server, server 216 is an IBM RS6000 based server, and server 218 is an IBM AS/400-based server. Of course, one of ordinary skill in the art will appreciate that different types of servers may also be used. The back-end server system 212 performs several fundamental functions. For example, the back-end server system 212 can collect data from the slot floor, as communicated to it from other network components, and maintain the collected data in its database. The back-end server system 212 may use slot floor data to generate a report used in casino operation functions. Examples of such reports include, but are not limited to, accounting reports, security reports, and usage reports. The back-end server system 212 may also pass data to another server for other functions. Alternatively, the back-end server system 212 may pass data stored on its database to floor hardware for interaction with a game or slot player. For example, data such as a game player's name or the amount of a ticket being redeemed at a game, may be passed to the floor hardware. Additionally, the back-end server system 212 may comprise one or more data repositories for storing data. Examples of types of data stored in the back-end server system data repositories include, but are not limited to, information relating to individual player play data, individual game long-term accounting data, cashable ticket data, and sound data including optimum audio outputs for various casino settings. Additionally, animation and graphic files may also be stored in the back-end server system data repositories.

The network bridges 220 and network rack 222 shown in FIG. 11 are networking components. These networking components, which may be classified as middleware, facilitate communications between the back-end server system 212 and the game management units 226. The network bridges 220 concentrate the many game management units 226 (2,000 on average) into a fewer number (nominally 50:1) of connections to the back-end server system 212. Additionally, the network rack 222 may also concentrate game management units 226 into a fewer number (2000:1) of connections to the back-end server system 212. The network bridges 220 and network rack 222 may comprise data repositories for storing network performance data. Such performance data may be based on network traffic and other network-related information.

Optionally, the network bridge 220 and the network rack 222 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The gaming machines 224 illustrated in FIG. 1 act as terminals for interacting with a player playing a casino game. In various embodiments, any of the gaming machines 224 may be a mechanical reel spinning slot machine, a video slot machine, a video poker machine, a keno machine, a video blackjack machine, or a gaming machine offering one or more of the above-described games. Additionally, each gaming machine 224 may comprise one or more data repositories for storing data. Examples of information stored by the gaming machines 224 include, but are not limited to, maintenance history information, long-term play data, real-time play data and sound data. The sound data may include, but is not limited to, audio files, sound clips, way files, mp3 files and sound files saved in various other formats. Furthermore, each gaming machine 224 comprises an audio system (not shown) for outputting sound. Typically, the audio system comprises one or more speakers, an amplifier, and access to one or more sound files.

Game management units (GMUs) connect gaming machines to network bridges. The function of the GMU is similar to the function of a network interface card connected to a desktop personal computer (PC). Referring to FIG. 11, a GMU 226 connects a gaming machine 224 to the network bridge 220. Some GMUs 226 have much greater capability and can perform such tasks as calculating a promotional cash-back award for a player, generating a unique ID for a cash redeemable ticket, and storing limited amounts of game and transaction-based data. Some GMUs 226 may comprise one or more data repositories for storing data. The types of data stored by the GMUs 226 may include, but is not limited to, real-time game data, communication link performance data, real-time player play data and sound data including sound files and audio clips.

In one embodiment, the GMU 226 is a separate component located outside the gaming machine. Alternatively, in another embodiment, the GMU 226 is located within the gaming machine. Optionally, in an alternative embodiment, one or more gaming machines 224 connect directly to a network bridge 220 and are not connected to a GMU 226.

The back-end server system 212 may further comprise a slot data system (not shown) stored in one or more data repositories. The slot data system is a computerized accounting and machine monitoring system. Optionally, the back-end server system 212 may also comprise a casino management system (not shown). The casino management system provides casinos with a fully integrated, user-friendly software application to manage casino player tracking, promotional, and accounting functions. Features of the casino management system may include player tracking and analysis, table-game management, cage and credit, offer and event management, player club enrollment and redemption, and comprehensive reports and data analysis.

Additionally, the back-end server system 212 may feature a player tracking system (not shown). The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs.

Typically, the player tracking system is operatively connected to one or more input components on a gaming machine 224. These input components (not shown) include, but are not limited to, a slot for receiving a player tracking card, a keypad or equivalent, an electronic button receptor, a touch screen, or the like. The player tracking system may also include a database of all qualified players (i.e., those players who have enrolled in a player rating or point accruing program). Generally, the database for the player tracking system is separate from the gaming machine 224.

In a casino gaming system utilizing a player tracker system, player data may be retrieved from a recognized player to personalize an animated event. For example, in a triggered animated event, information pertaining to the player, such as player name, may be used to customize the animation. Specifically, the animated event may comprise a picture of the player, or the player's name. Additionally, based on the player's status, the player may be entitled to a maximum number of wild symbols when the animated event is triggered. For example, a player having VIP status may be entitled to more wild symbols than a player having non-VIP status.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A gaming machine-enabled method for playing a primary game, the gaming machine-enabled method comprising:

providing one or more servers that are connected to a physical network including a back-end server and a player tracking server, wherein the back-end server contains animation graphics and the player tracking server contains player tracking information;

providing a gaming machine that is connected to the one or more servers via the physical network, the gaming machine including a video display on which the primary game is presented using a game processor, wherein the animation graphics contained in the back-end server are accessible by the gaming machine via the physical network, wherein the player tracking server is in communication with the gaming machine via the physical network to transmit player tracking information;

receiving, via a player input component, player input to activate a primary game on the gaming machine;

activating, via the game processor, the primary game on the gaming machine;

presenting the activated primary game on the video display, the activated game comprising a primary game displaying one or more game icons in various locations on a main screen of the video display and upon the occurrence of a triggering event, the primary game appears to animate, via the game processor, at least one of the displayed game icons and move multiple wild icons about the main screen of the video display over one or more of the game icons, and randomly replacing one or more of the game icons with the multiple wild icons;

determining, via the game processor, whether the resulting combination of game icons and wild icons form any winning combinations; and awarding, via the game processor, a single game payout for the primary game.

2. The method of claim 1, wherein the triggering event is the presence of one or more particular icons, the particular location of one or more particular icons, the presence of a winning combination of icons, a particular number of consecutive wins, a maximum bet, a particular time, a particular player, or a combination thereof.

3. The method of claim 1, wherein the animation comprises animating one or more of the displayed game icons, such that the one or more animated game icons appear to produce the multiple wild icons.

4. The method of claim 1, wherein the animation comprises animating at least one particular game icon, such that the particular game icon appears to enlarge until it explodes to produce multiple wild icons.

5. The method of claim 1, wherein the multiple wild icons appear to move randomly about the display screen.

6. The method of claim 1, wherein the animated event comprises animating one or more of the displayed game icons, such that the two or more animated game icons appear to interact with each other to produce multiple wild icons.

7. The method of claim 1, wherein the animation comprises animating a first game icon and animating a second game icon, wherein the first animated game icon interacts with the second animated game icon and appears to cause the second animated icon to burst and produce multiple wild icons.

8. The method of claim 1, wherein each of the multiple moving wild icons is positioned in a fixed location on the display screen.

9. The method of claim 1, wherein the player input is the number of bets placed, the number of lines bet, or a combination thereof.

10. The method of claim 1, further comprising receiving player input to determine the final locations of the wild icons.

11. A video gaming system, the video gaming system comprising:

one or more servers that are connected to a physical network including a back-end server and a player tracking server, wherein the back-end server contains animation graphics and the player tracking server contains player tracking information;

a gaming machine that is connected to the one or more servers via the physical network, the gaming machine including a video display on which the primary game is presented using a game processor, wherein the animation graphics contained in the back-end server are accessible by the gaming machine via the physical network, wherein the player tracking server is in communication with the gaming machine via the physical network to transmit player tracking information;

one or more game icons for display in various locations on a main screen of the video display, wherein at least a first game icon is animated, via the game processor, to present an animated interaction between the first game icon and a second game icon that produces one or more additional icons from the second game icon;

at least one animated icon configured to produce multiple wild icons that move about the main screen of the video display and then are randomly positioned in fixed locations on the main screen of the video display, wherein player input affects the number of wild icons produced;

a memory device containing instructions, the memory device and the processor configured to execute instructions that trigger the presentation of the animated icon, evaluate whether one or more combinations of the game icons and the wild icons form any winning combinations, and award a payout for each winning combination.

12. The video gaming system of claim 11, wherein one or more or the wild icons produced is a multiplier wild icon.

13. The video gaming system of claim 11, wherein the means for triggering the presentation of the animated icon comprises the occurrence of a pre-defined triggering event.

14. The video gaming system of claim 13, wherein the triggering event is the presence of one or more particular icons, the particular location of one or more particular icons, the presence of a winning combination of icons, a particular number of consecutive wins, a maximum bet, a particular time, a particular player, or a combination thereof.

15. The video gaming system of claim 11, wherein at least one animated icon appears to enlarge and explode to produce multiple wild icons.

16. The video gaming system of claim 11, wherein the wagering game comprises more than one animated icon configured to produce multiple wild icons.

17. The video gaming system of claim 11, wherein the wagering game comprises a first animated icon that interacts with a second animated icon and causes the second animated icon to burst and produce multiple wild icons.

18. The video gaming system of claim 11, wherein each of the multiple moving wild icons is positioned in a fixed location on the display screen.

19. The video gaming system of claim 11, wherein the player input is the number of bets placed, the number of lines bet, or a combination thereof.

20. The video gaming system of claim 11, further comprising receiving player input to determine the final positions of additional icons.

21. A gaming machine-enabled method for playing a game, the gaming machine-enabled method comprising:

providing one or more servers that are connected to a physical network including a back-end server and a player tracking server, wherein the back-end server contains animation graphics and the player tracking server contains player tracking information;

providing a gaming machine that is connected to the one or more servers via the physical network, the gaming machine including a video display on which the primary game is presented using a game processor, wherein the animation graphics contained in the back-end server are accessible by the gaming machine via the physical network, wherein the player tracking server is in communication with the gaming machine via the physical network to transmit player tracking information;

receiving, via a player input component, player input to activate a primary game on the gaming machine;

activating, via the game processor, the primary game and displaying one or more game icons in various fixed locations on a main screen of the video display;

presenting an animated event, via the game processor, upon the occurrence of a triggering event during the primary game, wherein the animated event comprises moving a game icon over the various fixed locations on the display screen, appearing to animate at least one of the displayed game icons, producing multiple wild icons from the moving game icon, and randomly replacing one or more game icons in the various fixed locations on the main screen of the video display with the multiple wild icons;

determining, via the game processor, whether the resulting combination of game icons and wild icons form any winning combinations; and awarding, via the game processor, a single payout for the primary game based on one or more winning combinations.

* * * * *